United States Patent [19]

Smallegan

[11] 4,207,501
[45] Jun. 10, 1980

[54] LAMP CONTROL CIRCUIT USING HEATER/THERMISTOR TIME DELAY

[75] Inventor: Jon M. Smallegan, Farmington Hills, Mich.

[73] Assignee: Novo Products, Inc., Redford, Mich.

[21] Appl. No.: 880,613

[22] Filed: Feb. 23, 1978

[51] Int. Cl.² .................... H05B 39/04; H01J 39/12
[52] U.S. Cl. .................... 315/159; 250/214 AL; 307/141; 315/156; 315/360; 361/198
[58] Field of Search ............ 315/82, 83, 149, 156, 315/159, 158, 194, 309, 360; 250/214 R, 214 AL, 239, 214 SW, 214 B; 307/117, 311, 252 B, 141, 310; 328/2; 361/173, 175, 198

[56] References Cited

U.S. PATENT DOCUMENTS

| | | | |
|---|---|---|---|
| 3,392,284 | 7/1968 | Cain | 250/214 R |
| 3,418,480 | 12/1968 | Miller | 315/156 X |
| 3,898,516 | 8/1975 | Nakasone | 315/309 X |

Primary Examiner—Eugene R. LaRoche
Attorney, Agent, or Firm—Harness, Dickey & Pierce

[57] ABSTRACT

A lamp control circuit having a heater and thermistor coupled between the illumination sensitive device and the control electrode of an SCR or triac for providing a time delay between the detection of a change in illumination and the switching of the SCR or triac.

6 Claims, 2 Drawing Figures

LAMP CONTROL CIRCUIT USING HEATER/THERMISTOR TIME DELAY

BACKGROUND AND SUMMARY OF THE INVENTION

The present invention relates to an improvement in an illumination responsive lamp control circuit, and particularly, in a delay device for delaying the response of the circuit to changes in illumination.

It is desirable to delay the response of a lamp control circuit to a change in illumination to avoid response to certain transient illumination conditions, and additionally, to avoid lamp flicker at threshold illumination levels, i.e., at illumination levels near the threshold for the energization/de-energization of the lamp.

By way of practical examples illustrating the need for such delay in the control of the lamp, consider the use of an illumination responsive headlamp control for an automobile. It is desirable to keep the headlamps on during the night time period even though the illumination sensor may be temporarily exposed to street lamp illumination above the threshold level. Furthermore, it is desirable to keep the headlamps off during the day time period even during intermittent low levels of illumination encountered within tunnels or beneath underpasses. Even in other applications such as outdoor lighting, both decorative and functional, a delay in the control of the lamp is desirable. Consider, for example, a decorative post lamp which is periodically illuminated by headlights. A delay circuit could prevent spurious response to headlamps.

The usual method for providing such a time delay is to incorporate a capacitor time-delay circuit. Such a circuit would include a capacitor, a source of charging current for the capacitor, a discharging path for the capacitor and a threshold device such as a unijunction transistor. It will be appreciated that capacitor time-delay circuits are relatively expensive to produce and are complex in their structure and operation. As a result of their complexity, construction costs are significant and the reliability of the circuit is adversely affected.

The present invention provides a simple, compact, low cost and reliable delay device for a lamp control circuit. The circuit requires no moving parts such as relays and the like, and does not require relatively expensive capacitors and threshold devices such as unijunction transistors.

According to the present invention, a delay device is interposed between the illumination sensor and the controlled conduction device, e.g., an SCR or triac, which features thermal transfer of a signal from the illumination sensor to the controlled conduction device. For example, a delay circuit may include a heater/resistor connected in series with the illumination sensor so that the thermal energy output of the heater/resistor is a function of the illumination level. The heater/resistor is in thermal transfer relationship with a temperature responsive device such as a thermistor. The thermistor is responsive to the thermal energy emitted by the heater/resistor and is connected to the controlled conduction device to control the conduction thereof in accordance with received thermal energy. Since a finite period of time is required for the heater/resistor to either increase its temperature or decrease its temperature in response to a change of illumination level, since a further finite period of time is required for thermal transfer between the thermistor and the heater/resistor, and since a still further finite period of time is required for the temperature of the thermistor to change to thereby change the control signal supplied to the controlled conduction device, the heater/resistor and thermistor combination introduces a time delay in the response of the controlled conduction device to a change in the illumination level which is a function of all three delays. The delay period can be adjusted by adjusting the thermal output of the heater/resistor, the temperature sensitivity of the thermistor, the thermal capacity of the thermal transfer structure associated with the heater/resistor and thermistor, and the length and conductivity of the thermal path of such thermal transfer structure. These factors can be controlled to introduce a time delay of appropriate duration.

DETAILED DESCRIPTION OF THE PREFERRED EMBODIMENTS

Figure 1:
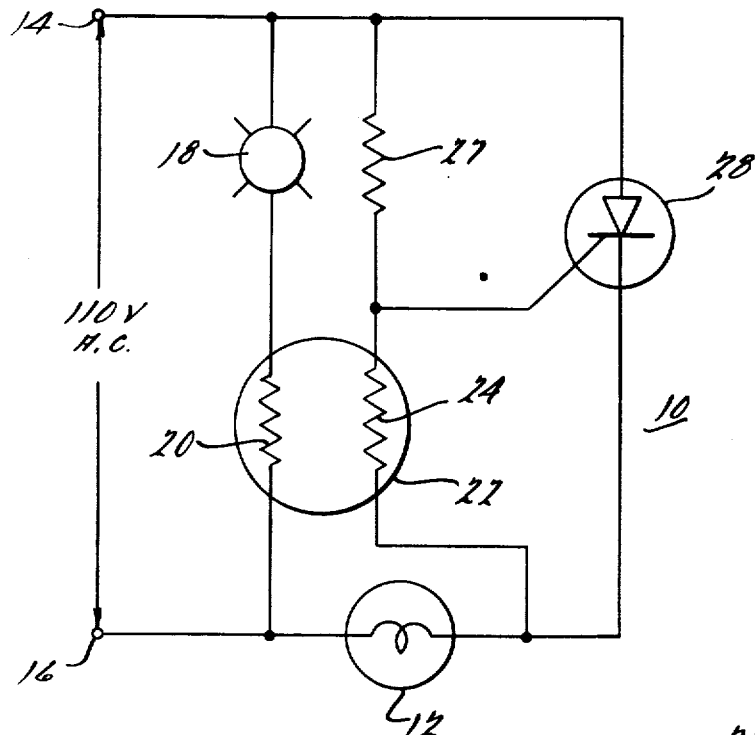
FIG. 1 is a circuit diagram of a first embodiment of the present invention.

In FIG. 1, a lamp control circuit 10 is illustrated for controlling the current through an incandescent lamp 12 which is received from power supply terminals 14 and 16. Terminals 14 and 16 may be connected to receive 110 volt AC household current. The circuit 10 includes a photocell 18 which is responsive to the level of illumination impinging on the photocell 18, and particularly, the photocell 18 has a resistance which increases as illumination level decreases. The photocell 18 is connected in series with the heater/resistor portion 20 of a delay device 22 across the terminals 14 and 16 to receive the 110 volt AC current waveform. The heater/resistor 20 is in thermal transfer relationship with a thermistor 24. Particularly, the heater/resistor 20 and the thermistor 24 are each secured to a conducting base member 26 which, for example, may be made of a metal such as aluminum. Alternatively, no base member 26 may be used and the heater/resistor 20 and the thermistor 24 may be in direct physical contact. The heater/resistor 20 and the thermistor 24 may be secured to the base member 26 by a suitable epoxy, for example, such as the epoxies currently in use for securing solid state devices to a heat sinks. The sensitivity of the photocell 18, the resistivity of heater/resistor 20, the spacing between the heater/resistor 20 and the thermistor 24, the volume of the base member 26, the material of the base member 26 and the sensitivity of the thermistor 24 are selected to provide a suitable time delay, for example, a time delay of 5 to 10 seconds.

It should be noted that the resistivity of the heater/resistor 20 is related to its thermal output, and particularly, for lesser resistivity, the heat output increases. Also, as the volume of the base member 26 increases, its thermal capacity increases thereby increasing the time delay for turn on and turn off of the SCR 28. Furthermore, the higher the conductivity of the material used for the base member 26, the lesser the time delay for turn on and turn off of the SCR 28. Additionally, as the spacing between the heater/resistor 20 and the thermistor 24 increases, the time delay for turn on and turn off of the SCR 28 increases. Finally, as the sensitivity of the thermistor 24 increases, i.e., to provide a greater resistance per degree change in temperature, the time delay for turn on and turn off of the SCR 28 decreases. All of these factors can be adjusted to provide the appropriate time delay. Additionally, the base member 26 may be connected to a heat sink or may have fins for increasing the rate of dissipation of the thermal energy generated by the heater/resistor 20. An increase in the rate of dissipation of thermal energy decreases the time delay for turn on of the SCR 28 but decreases the time delay for turn off of the SCR 28 so that the incorporation of such heat sink or fins may be used to provide a difference in the time delay for turn on of the SCR 28 relative to the time delay for turn off of the SCR 28.

The thermistor 24 of the time delay device 22 is connected in series with a resistor 27 across the 110 volt terminals 14 and 16 via the lamp 12. A controlled conduction device, in this case an SCR 28, is connected at its anode with terminal 14 and at its cathode with one end of the lamp 12. The outer end of the lamp 12 is connected to terminal 16 so that conduction of the SCR 28 causes illumination of the lamp 12. The gate of the SCR 28 is connected intermediate the thermistor 24 and resistor 27 so as to be responsive to the potential at the junction of the thermistor 24 and the resistor 27.

In the operation of the circuit 10 of FIG. 1, as the illumination level decreases, the resistance of the photocell 18 increases to decrease the current through the heater/resistor 20. As the current decreases through the heater/resistor 20, the thermal energy emitted by the heater/resistor 20 decreases to decrease the temperature of the base member 26, and in turn, the temperature of the thermistor 24. As the temperature of the thermistor 24 decreases, the resistance of thermistor 24 increases to increase the potential at the junction of thermistor 24 and resistor 27. When the illumination level at the photocell 18 falls below the threshold level of the system 10, the potential at the junction of thermistor 24 and resistor 27 increases to the gating level of the SCR 28 whereupon the SCR 28 conducts to provide current on each half cycle of the 110 volt waveform that the terminal 14 is positive relative to the terminal 16. The SCR 28 supplies such half cycles of current to the lamp 12 to illuminate the lamp 12. It shall be noted that a decrease in the illumination level below the threshold level is not immediately responded to by the SCR 28 since a finite period of time is required for the transfer of sufficient heat from the thermistor 24 via the base member 26 to raise the potential at the junction of thermistor 24 and resistor 27 to the gating level of the SCR 28.

As previously stated, this period of time can be adjusted by adjusting the value of the heater/resistor 20, the spacing of the heater/resistor 20 and the thermistor 24, the conductivity of the path between the heater/resistor 20 and the thermistor 24, the thermal capacity of the base member 26, and the temperature sensitivity of the thermistor 24.

When the illumination level increases, the resistivity of the photocell 18 decreases so as to increase the current through the heater/resistor 20. As the current is increased, the emission of thermal energy by the heater/resistor 20 is correspondingly increased so that the temperature of the base member 26 and the thermistor 24 are gradually increased. As the temperature of the thermistor 24 is increased, its resistance is decreased to decrease the potential at the gate of SCR 28. When the potential at the gate of SCR 28 falls below the gating potential of SCR 28, upon the next reverse bias of SCR 28, the SCR 28 will turn off and remain off so long as the potential at its gate remains below the gating level of the SCR 28. It should be noted that the time delay structure 22 imposes a time delay between the increase of illumination impinging upon the photocell 18 above the threshold level of the system and the time at which the SCR 28 turns off and remains off.

Figure 2:
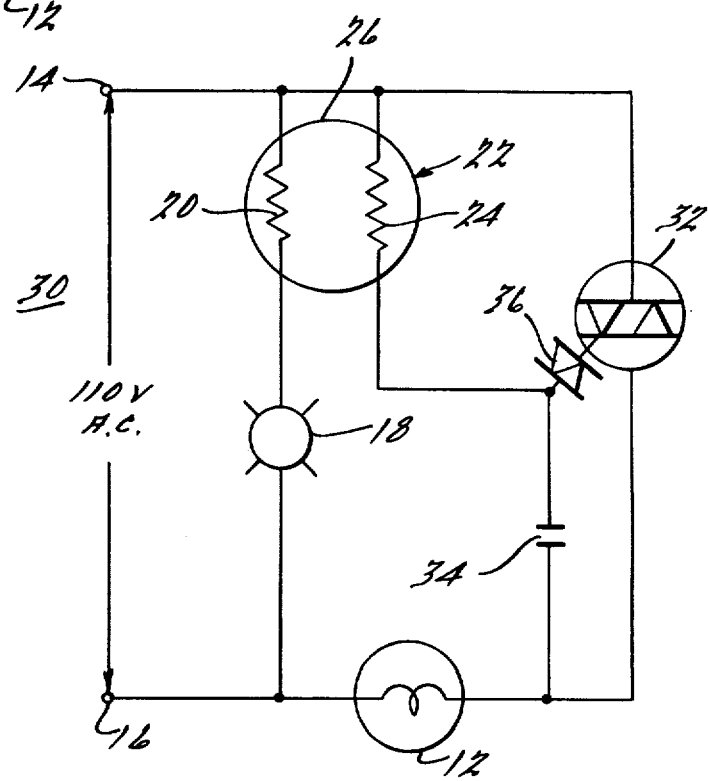
FIG. 2 is a circuit diagram of a second embodiment of the present invention.

In FIG. 2, another embodiment 30 of the present invention is illustrated. The embodiment 30 is adapted to provide full wave energization of the lamp 12. In FIG. 2, components like those of FIG. 1 have been given like numerals. In the embodiment 30, a triac 32 is used in place of the SCR 28. The triac 32 is a full wave device such that upon gating of the triac 32, the triac 32 conducts in both directions to provide the full AC waveform to the lamp 12. In the embodiment 30, a capacitor 34 is used in place of the resistor 27 for establishing a breakover voltage of a diac 36. The diac 36 is interposed between the junction of the thermistor 24/capacitor 34 and the gate of the triac 32.

The operation of the embodiment 30 is the same as the operation of the embodiment 10 except for the application of the full waveform to the lamp 12, and hence, will not be repeated here. It should be noted that the triac 32 is gated when the resistance of the thermistor 24 is reduced to a level which provides a voltage to the gate of the triac 32 which is above the gate potential of the triac 32.

As to the embodiments 10 and 30, the series connection of the heater/resistor 20 and the photocell 18 optionally may be connected between the terminal 14 and the junction of the cathode of the SCR 28 and the lamp 12. In this manner, the current for the heater/resistor 20 flows through the filament of the lamp 12 so that removal of the lamp 12 interrupts this heater current. In the absence of the heater circuit, the SCR 28 or the triac 32 cannot be gated even if the illumination level impinging on the photocell 18 falls below the threshold level. Consequently, the socket or contacts for the lamp 12 are not energized and will not be energized until a low impedance is inserted across the contacts for the lamp 12. This optional configuration would avoid shock if a person were to insert a finger or the like across the contacts for the lamp 12 since a human finger normally has too high a resistance to provide adequate heater current for the switching of the SCR 28 or the triac 32.

In one form of the circuits according to the present invention, the following components were used:
Lamp 12—Incandescent—Max. 150 watt
Photocell 18—Vactec VT771, 2K @ 2fc, voltage 150
Resistor 20—15K ohm
Thermistor 24—Fenwal KP41J2, 10K @ 25° C.
Base Member—not used
Resistor 27—1 Meg
SCR 28—GE C107B41
Triac 32—Teccor Q2006LT Although the present invention has been described with respect to a time delay for controlling a lamp, it will be appreciated that the principles of this invention are applicable to other circuits and uses. Accordingly, the scope of the invention should be measured by the appended claims.

What is claimed is:

1. For a control circuit for controlling current from a current source to a load in accordance with a level of illumination, the control circuit including controlled conduction means having a control electrode and being connected to said current source for conducting in response to a predetermined control signal supplied to the control electrode to supply said current to said load, an improved illumination sensing and delay circuit for delaying the conduction of said controlled conduction means in response to changes in the level of illumination comprising:

sensing means having a resistance that changes in response to the level of illumination at said sensing means;

thermal energy emitting means for emitting thermal energy in response to current therethrough, said thermal energy emitting means being connected in series with said sensing means, said series connection of said sensing means and said thermal energy emitting means being connected across said current source;

a voltage divider comprising a first impedance means connected in series with a temperature responsive resistor, said temperature responsive resistor having a resistance that changes in response to the temperature thereof, said voltage divider being connected across said current source;

said thermal energy emitting means and said temperature responsive resistor being connected in thermal transfer relationship for transfer of thermal energy from said thermal energy emitting means to said temperature responsive resistor; and connecting means connecting said control electrode of said controlled conduction means to said voltage divider intermediate said first impedance means and said temperature responsive resistor so that as the illumination level at said sensing means changes, the resistance of said sensing means changes to change the current through said thermal energy emitting means, thereby changing the amount of thermal energy emitted by said thermal energy emitting means, the amount of thermal energy emitted by said thermal energy emitting means being effective to change the temperature of said temperature responsive resistor to in turn change the resistance of the temperature responsive resistor, a predetermined change in said resistance of said temperature responsive resistor causing said predetermined control signal at said control electrode to cause conduction of said controlled conduction means.

2. A control circuit according to claim 1 wherein:

said controlled conduction means is an SCR having an anode, cathode and gate with said control electrode being the gate of said SCR, and said first impedance means is a first resistor;

said voltage divider is connected so that said first resistor is connected between said anode and said gate of said SCR and said temperature responsive resistor is connected between said gate and said cathode of said SCR.

3. A control circuit according to claim 1 wherein:

said controlled conduction means is a triac having two main electrodes and said control electrode and said first impedance means is a capacitor;

said voltage divider is connected so that said capacitor is connected between one main electrode of said control electrode of said triac and said temperature responsive resistor is connected between said control electrode and the other main electrode of said triac.

4. For a control circuit for controlling current from a current source to a pair of contacts for the filament of a lamp in accordance with a level of illumination, the control circuit including controlled conduction means having a control electrode and being connected to said current source for conducting in response to a predetermined control signal supplied to the control electrode to supply said current to said lamp contacts to energize said lamp filament, an improved illumination sensing and delay circuit for delaying the conduction of said controlled conduction means in response to changes in the level of illumination comprising:

sensing means having a resistance that changes in response to the level of illumination at said sensing means;

thermal energy emitting means for emitting thermal energy in response to current therethrough, said thermal energy emitting means being connected in series with said sensing means, said series connection of said sensing means and said thermal energy emitting means being connected across said current source;

a voltage divider comprising a first impedance means connected in series with a temperature responsive resistor, said temperature responsive resistor having a resistance that changes in response to the temperature thereof, said voltage divider being connected across said current source by a connection through said lamp contacts so that the current from said current source which passes through said voltage divider also passes through the filament of said lamp;

said thermal energy emitting means and said temperature responsive resistor being connected in thermal transfer relationship for transfer of thermal energy from said thermal energy emitting means to said temperature responsive resistor; and connecting means connecting said control electrode of said controlled conduction means to said voltage divider intermediate said first impedance means and said temperature responsive resistor so that as the illumination level at said sensing means changes, the resistance of said sensing means changes to change the current through said thermal energy emitting means, thereby changing the amount of thermal energy emitted by said thermal energy emitting means, the amount of thermal energy emitted by said thermal energy emitting means being effective to change the temperature of said temperature responsive resistor to in turn change the resistance of the temperature responsive resistor, a predetermined change in said resistance of said temperature responsive resistor causing said predetermined control signal at said control electrode to cause conduction of said controlled conduction means, said connection of said voltage divider across said source through said lamp contacts being effective to disconnect the path for the current from said current source which passes through said voltage divider upon disconnection of said lamp filament from said lamp contacts to thereby prevent said predetermined control signal from being supplied to said control electrode and inhibit the conduction of said controlled conduction means which would energize said lamp contacts.

5. A control circuit according to claim 4 wherein:

said controlled conduction means is an SCR having an anode, cathode and gate with said control electrode being the gate of said SCR, and said first impedance means is a first resistor;

said voltage divider is connected to that said first resistor is connected between said anode and said gate of said SCR and said temperature responsive resistor is connected between said gate and said cathode of said SCR.

6. A control circuit according to claim 4 wherein:
said controlled conduction means is a triac having two main electrodes and said control electrode and said first impedance means is a capacitor;
said voltage divider is connected so that said capacitor is connected between one main electrode of said control electrode of said triac and said temperature responsive resistor is connected between said control electrode and the other main electrode of said triac.

* * * * *